(12) United States Patent
Ho

(10) Patent No.: US 8,942,771 B1
(45) Date of Patent: ＊Jan. 27, 2015

(54) DYNAMIC DATA REFRESH FOR MOBILE DEVICE APPLICATIONS

(75) Inventor: Samuel Ho, San Francisco, CA (US)

(73) Assignee: Google Inc., Mountain View, CA (US)

( * ) Notice: Subject to any disclaimer, the term of this patent is extended or adjusted under 35 U.S.C. 154(b) by 236 days.

This patent is subject to a terminal disclaimer.

(21) Appl. No.: 12/938,121

(22) Filed: Nov. 2, 2010

(51) Int. Cl.
*H04M 1/00* (2006.01)

(52) U.S. Cl.
USPC ........... 455/572; 455/574; 455/423; 455/424; 709/203; 709/219; 711/118

(58) Field of Classification Search
CPC ................ H04M 16/61; H04M 15/66; H04L 2025/0349; H04L 43/0876; H04L 41/0896; H04L 2209/80; H04L 47/824; H04B 3/32; H04B 7/2662; H04B 7/0404; H04B 7/0643; H04W 4/003; H04W 56/00; H04W 36/0033; H04W 56/004; H04W 84/18; H04W 12/02; H04W 24/02; H04W 28/0215; H04W 52/0261; H04W 52/0277; H04W 52/0296; H04W 36/08; H04W 48/18; H04W 88/02; H04W 36/24; H04W 52/143; H04W 52/146; H04W 28/0231; H04W 40/12; H04W 72/04; H04W 72/048; H04N 19/00236; H04N 19/0003; H04N 7/147; H04N 13/0438; H04N 13/0497; H04N 21/23424; G06F 1/1694; G06F 1/3212; G06F 2200/1637
USPC ................. 455/572, 423, 424; 709/203, 219; 711/118
See application file for complete search history.

(56) References Cited

U.S. PATENT DOCUMENTS

| | | | |
|---|---|---|---|
| 5,175,867 A | 12/1992 | Wejke et al. | |
| 6,941,310 B2 | 9/2005 | Ahad et al. | |
| 7,437,509 B2 | 10/2008 | Vayssiere | |
| 7,769,805 B1 | 8/2010 | Barnes et al. | |
| 2004/0203436 A1 | 10/2004 | Oesterling | |
| 2005/0176420 A1 | 8/2005 | Graves et al. | |
| 2005/0233733 A1* | 10/2005 | Roundtree et al. | ......... 455/414.1 |
| 2006/0173950 A1 | 8/2006 | Longobardi et al. | |
| 2007/0213101 A1 | 9/2007 | Oh et al. | |
| 2007/0218862 A1* | 9/2007 | Tatman et al. | ................ 455/403 |
| 2008/0158177 A1 | 7/2008 | Wong et al. | |

OTHER PUBLICATIONS

Office Action from U.S. Appl. No. 13/250,942, dated Dec. 29, 2011, 39 pgs.
Response to Office Action dated Dec. 29, 2011, from U.S. Appl. No. 13/250,942, filed Mar. 29, 2012, 12 pp.
Advisory Action from U.S. Appl. No. 13/250,942, dated Aug. 13, 2012, 4 pp.
Response to Advisory Action dated Aug. 13, 2012, from U.S. Appl. No. 13/250,942, filed Oct. 4, 2012, 14 pp.
Office Action from U.S. Appl. No. 13/250,942, dated Jun. 4, 2012, 45 pgs.

(Continued)

*Primary Examiner* — Nimesh Patel
(74) *Attorney, Agent, or Firm* — Shumaker & Sieffert, P.A.

(57) ABSTRACT

The frequency with which data is refreshed for an application executed by a mobile device may be dynamically set based on one or more of the state of the battery or the network access of the device, or the frequency with which the application is used. The data refresh frequency may also be dynamically set based on additional parameters, including, e.g., the strength of the signal of the network over which the mobile device is communicating.

23 Claims, 4 Drawing Sheets

(56) References Cited

OTHER PUBLICATIONS

Response to Office Action dated Jun. 4, 2012, from U.S. Appl. No. 13/250,942, filed Aug. 6, 2012, 11 pgs.
Notice of Allowance from U.S. Appl. No. 13/250,942, dated Aug. 4, 2014 9 pp.

Office Action from U.S. Appl. No. 13/250,942, dated Apr. 22, 2014, 48 pages.

Response to Office Action dated Apr. 22, 2014, from U.S. Appl. No. 13/250,942, filed Jul. 21, 2014, 12 pages.

\* cited by examiner

DYNAMIC DATA REFRESH FOR MOBILE DEVICE APPLICATIONS

TECHNICAL FIELD

This disclosure relates to mobile devices.

BACKGROUND

Mobile devices provide the benefit of being portable while allowing a user to perform a variety of functions including various forms of communication and computing. For example, some mobile devices are capable of accessing the Internet, executing gaming applications, playing videos and music, as well as providing functionality of a traditional mobile, e.g. cellular, phone. As mobile devices are not tethered to a physical communication medium or stationary power source, such devices are generally powered by a rechargeable battery. A persistent challenge in mobile device design is increasing the length of time the device may operate without recharging the battery.

SUMMARY

In general, this disclosure is directed to techniques for dynamically refreshing data employed in one or more applications executed on a mobile device. In one example, a method includes determining at least one of a battery state or a network access state of a mobile device and setting, by a computing device, a data refresh frequency for at least one application executable by the mobile device based on the at least one of the battery state or the network access state of the mobile device. The battery state includes one or both of a power state and a charge state of a battery of the mobile device. The network access state includes a type of network accessed by the mobile device. The data refresh frequency includes a frequency with which updated data for the at least one application is periodically received from a computing device external to the mobile device.

In another example, a mobile device configured to execute at least one application includes a battery and a telemetry module. The mobile device also includes means for determining at least one of a battery state of the battery or a network access state of the telemetry module and setting a data refresh frequency for the at least one application based on the at least one of the battery state or the network access state. The battery state includes one or both of a power state and a charge state of a battery of the mobile device. The network access state includes a type of network accessed by the mobile device. The data refresh frequency includes a frequency with which updated data for the at least one application is periodically received from a computing device external to the mobile device.

In another example, a computer readable storage medium includes instructions for causing a programmable processor to determine at least one of a battery state or a network access state of a mobile device and set a data refresh frequency for at least one application executable by the mobile device based on the at least one of the battery state or the network access state of the mobile device. The battery state includes one or both of a power state and a charge state of a battery of the mobile device. The network access state includes a type of network accessed by the mobile device. The data refresh frequency includes a frequency with which updated data for the at least one application is periodically received from a computing device external to the mobile device.

The details of one or more embodiments of the disclosure are set forth in the accompanying drawings and the description below. Other features, objects, and advantages of the disclosure will be apparent from the description and drawings, and from the claims.

DETAILED DESCRIPTION

This disclosure is directed to techniques for managing data refresh frequencies dynamically for both system and end-user applications to optimize battery life and network congestion while improving end-user experience. Data refresh frequency refers to a frequency with which updated data for applications executed by a mobile device is periodically received from a computing device external to the mobile device. Currently, data refresh and caching for mobile device applications is configured on a per application basis without coordination between multiple applications and without regard to factors such as battery consumption or network congestion. Instead, application data refresh frequencies, e.g., are commonly a function of an interval of time, e.g. daily, hourly, or weekly, that does not depend on other parameters. Users are able to customize such default refresh frequencies for individual applications. However, such techniques do not provide an optimal user solution or even a significant improvement over the default configuration. The techniques described in this disclosure allow application data refresh frequencies to be set dynamically as a function of, e.g., battery state, network access state, and application usage across multiple applications. Battery state may define a power state, e.g. plugged in and charging or in-use, or a charge state, e.g. a percentage battery life remaining for a battery of a mobile device in examples according to this disclosure. Network access state may define a type of network accessed by a mobile device in examples according to this disclosure.

Figure 1:
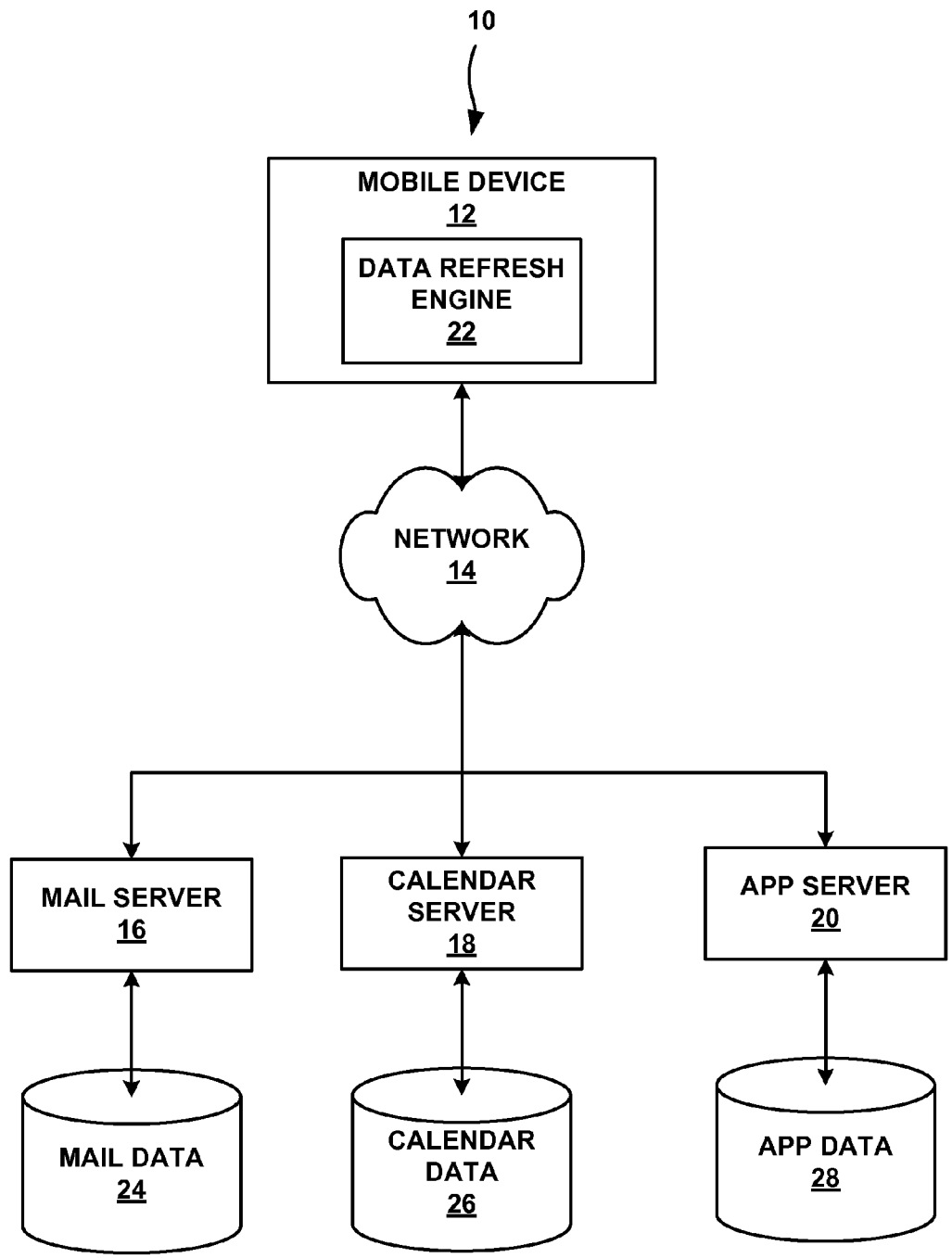
FIG. 1 is a block diagram illustrating an example system that may be used for aggregating battery life data from a number of mobile devices.

FIG. 1 is a block diagram illustrating example system 10 including a mobile device 12, a network 14, a mail server 16, a calendar server 18, and an application server 20. Mobile device 12 includes a data refresh engine 22, which, as described in detail below, is configured to dynamically set data refresh frequencies for one or more applications executed by the mobile device. Additionally, mail server 16, calendar server 18, and application server 20 are communicatively connected with one or more data repositories, in particular, mail data 24, calendar data 26, and application data 28, respectively. Mobile device 12 is communicatively connected to data mail server 16, calendar server 18, and application server 20 via network 14. Mobile device 12 is configured to communicate with mail server 16, calendar server 18, and application server 20 over network 14 to periodically refresh data associated with the applications executed on the device, e.g. an e-mail, calendar, and third party applications.

Mobile device 12 may include any number of different portable electronic mobile devices, including, e.g., cellular phones, personal digital assistants (PDAs), laptop computers, portable gaming devices, portable media players, e-book readers, watches, and the like. Additionally, mobile device 12 may be employed in the disclosed examples by different types of users, including, e.g., test users and consumers. Test users may include employees of the mobile device and/or software manufacturer, while consumers may be the purchasers of the devices. In some examples, the type and amount of data and usage patterns that is tracked by mobile device may depend on the type of user associated with a particular device or a number of devices. In any case, regardless of the type, system 10 may be configured such that users may opt-in or opt-out of dynamic data refresh functions executable by mobile device 12.

Network 14 may include one or more terrestrial and/or satellite networks interconnected to provide a means of communicatively connecting mobile device 12 to mail server 16, calendar server 18, and application server 20, as well as mail data 24, calendar data 26, and application data 28. For example, network 14 may be a private or public local area network (LAN) or Wide Area Network (WANs). Network 14 may include both wired and wireless communications according to one or more standards and/or via one or more transport mediums. For example, network 14 may include wireless communications according to one of the 802.11 or Bluetooth specification sets, or another standard or proprietary wireless communication protocol. Network 14 may also include communications over a terrestrial cellular network, including, e.g. a GSM (Global System for Mobile Communications), CDMA (Code Division Multiple Access), EDGE (Enhanced Data for Global Evolution) network. Data transmitted over network 14, e.g., from mobile device 12 to data repository 16 may be formatted in accordance with a variety of different communications protocols. For example, all or a portion of network 14 may be a packet-based, Internet Protocol (IP) network that communicates data from mobile device 12 to data repository 16 in Transmission Control Protocol/Internet Protocol (TCP/IP) packets, over, e.g., Category 5, Ethernet cables.

Mail server 16, calendar server 18, and application server 20 may be any of several different types of network devices. For example, servers 16, 18, 20 may include a data processing appliance, web server, specialized media server, personal computer operating in a peer-to-peer fashion, or another type of network device. Additionally, although example system 10 of FIG. 1 includes three servers, mail server 16, calendar server 18, and application server 20, associated with three applications executed on mobile device 12, other examples may include different numbers of collocated or distributed servers configured to communicate application data with mobile device 12. For example, mobile device 12 may include a number of third party applications, and data refresh engine 22 may therefore be configured to communicate not just with one application server, e.g. application server 20 of example system 10 of FIG. 1, but with a number of application servers corresponding to the third party applications executed by the mobile device.

Data repositories of system 10, i.e. mail data 24, calendar data 26, and application data 28 may include, e.g., a standard or proprietary database or other data storage and retrieval mechanism. Mail data 24, calendar data 26, and application data 28 may be implemented in software, hardware, and combinations of both. For example, mail data 24, calendar data 26, and application data 28 may include proprietary database software stored on one of a variety of storage mediums on a data storage server connected to network 14 and configured to collect battery life data from mobile devices. Storage medium included in or employed in cooperation with data repository 16 may include, e.g., any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Although mail data 24, calendar data 26, and application data 28 and mail server 16, calendar server 18, and application server 20 are illustrated as separate components in example system 10 of FIG. 1, in other examples each of the respective pairs of server and data repository, e.g. mail server 16 and mail data 24, may be combined or may each be distributed amongst more than one device. For example, mail server 16 may store mail data 24 and control the repository to periodically supply fresh e-mail data to mobile device 12. In another example, mail data 24 may be distributed among a number of separate devices, e.g. a number of database servers, and mail server 16 may include a number of co-located or distributed servers configured to operate individually and/or in cooperation with one another and with the various devices comprising mail data 24.

In the example of FIG. 1, mobile device 12 includes a number of applications, including, e.g. an e-mail, calendar, and third party application configured to refresh application data periodically by communicating with mail server 16, calendar server 18, and application server 20, respectively, over network 14. For example, an e-mail application executed by mobile device 12 may be configured to receive refreshed data stored on mail data 24 from mail server 16 over network 14 once every hour. In some examples, the life of a battery of mobile device 12, as well as congestion of network 14 may be affected by the manner in and efficiency with which mobile device 12 refreshes application data over the network.

In one example, battery consumption of mobile device 12 may be increased as a result of repeated switching between different network access states of the mobile device. For example, network 14 may require a different access state for mobile device 12 at different times, as the mobile device travels between different types of networks. Additionally, network 14 may include multiple networks over which mobile device 12 may communicate with different speeds or effectiveness. In such examples, mobile device 12 may be configured to automatically or at the behest of a user select one of the networks included in network 14. In any event, mobile device 12 may need to switch network access states, e.g. between cellular network access, e.g. 3G access and local wireless network access, e.g. Wi-Fi access depending on network 14 in a particular locality or at a particular time. Repeated switching between network access states of mobile device 12 in order to communicate over network 14 may cause the battery of the device to become depleted or discharged rapidly.

Battery consumption of mobile device 12 may also be increased as a result of staying in a network access state with a higher battery consumption rate longer, e.g., as multiple applications executed on the device refresh data without any coordination between one another. For example, ten applications executed by mobile device 12 may be configured to refresh data daily. However, as there may be no coordination between the different applications of mobile device 12, the data may be refreshed at ten different times throughout the day. Lack of coordination of data refresh frequencies for applications of mobile device 12 may also increase congestion of network 14, which may, in turn, act to reduce the quality of service for users of the network.

Mobile device 12 includes data refresh engine 22, which may be configured to dynamically set application data refresh frequencies for one or more applications executed on the mobile device, e.g. e-mail, calendar, and third party applications, as a function of, e.g., battery state, network access state, and application usage across multiple applications. In one example, application data refresh frequencies for applications executed by mobile device 12 may be set as a function of the battery life of a battery of the mobile device. For example, in the event the battery of mobile device 12 drops below a threshold battery life, data refresh engine 22 may decrease the refresh frequency for one or more applications executed by the mobile device such that the applications receive refreshed data over network 14 less often. In other words, in the event the battery life of the battery of mobile device 12 is depleted to a certain level, data refresh engine 22 may automatically decrease the frequency with which some applications receive refreshed data over network 14 to conserve power of the mobile device. In another example, data refresh engine 22 may automatically disable data refresh for all non-essential (or another classification) applications executed by mobile device 12 in the event the battery of the mobile device drops below a threshold battery life.

In addition to battery state, application data refresh frequencies may be dynamically set by data refresh engine 22 based on the network access state, e.g. Wi-Fi or 3G, of mobile device 12. There are at least two possible reasons to set refresh frequencies as a function of the type of network mobile device 12 is accessing. One reason is that operation of mobile device 12 to refresh data over network 14 in one network access state may cause greater battery consumption than in another state. For example, application data refresh over a 3G network 14 may cause greater battery consumption due to poor signal quality resulting in longer transmission times, as well as a higher energy consumption per data unit size, e.g. Watts/bit, than, e.g. application data refresh over a Wi-Fi network 14. A second reason for setting data refresh frequencies for applications executed by mobile device 12 as a function of network access state is that it may congestion of network 14. Setting applications to refresh data under certain circumstances when the mobile device is in, e.g. a Wi-Fi access state versus a 3G access state may act to significantly reduce congestion over network 14, which may, in turn, improve service for users of the network.

As an additional parameter by which applications refresh data, mobile device 12, and, in particular, data refresh engine 22 may be configured to dynamically set the frequency with which applications executed by the mobile device receive refreshed data based on, in addition to or in lieu of battery or network access state, the frequency with which the applications are used. In other words, data refresh engine 22 may be configured to prioritize more frequently used applications executed by mobile device 12 over less frequently used applications.

In some examples, data refresh engine 22 may apply a default increased priority rating to certain applications executed by mobile device 12 due to the nature of the data upon which the applications operate. For example, applications that require fresh data for accurate and proper operation may be set to an increased priority level regardless of the frequency with which they are used.

As described above, lack of coordination of data refresh frequencies for applications of mobile device 12 may increase consumption of the battery of the mobile device, as well as increasing congestion of network 14. As such, in one example, mobile device 12, and, in particular, data refresh engine 22 may be configured to group the application data refresh times for some or all of a number of applications executed by the device together, i.e. at the same time.

In FIG. 1, mobile device 12 is illustrated as refreshing data for three applications by communicating with mail server 16, calendar server 18, and application server 20. However, in other examples, mobile device 12 may include more or fewer applications that refresh data via more or fewer servers over network 14. For example, mobile device 12 may include a contacts application communicating with a contacts server including contacts data, as well as a number of additional third party applications configured to refresh data with one or more additional application servers via network 14.

Figure 2:
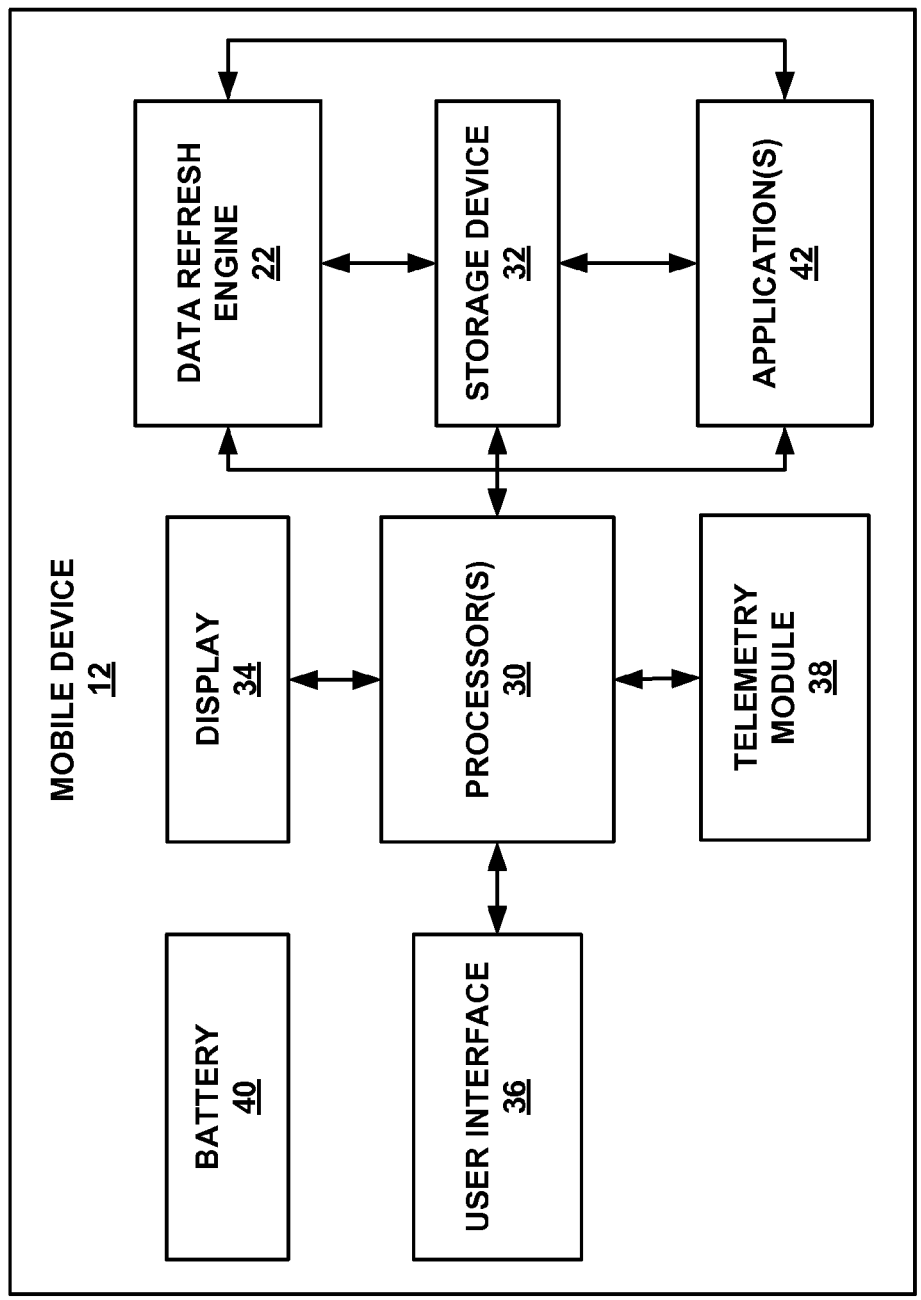
FIG. 2 is a block diagram illustrating an example battery life data processing engine of the system of FIG. 1.
Figure 3:
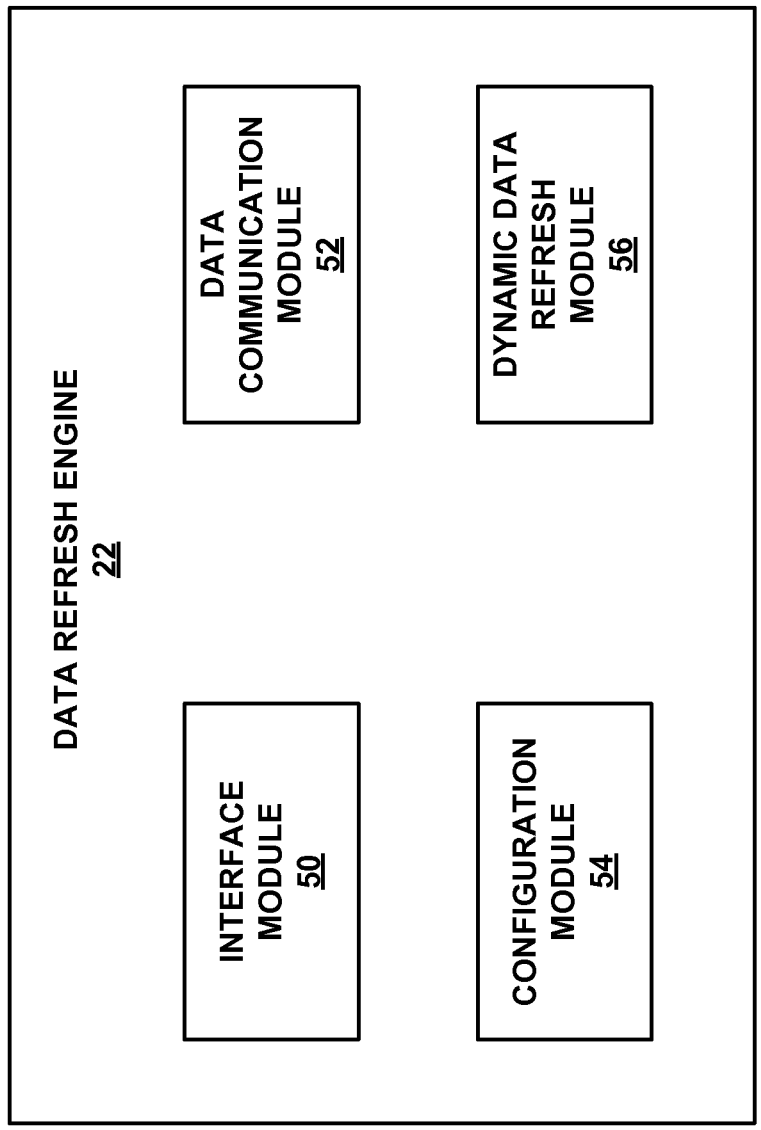
FIG. 3 is a block diagram illustrating an example mobile device of the system of FIG. 1.

FIG. 2 is a block diagram illustrating example mobile device 12 including data refresh engine 22, processor 30, storage device 32, display 34, user interface 36, telemetry module 38, battery 40, and applications 42. In examples where device 12 is a cellular phone, the device may also include a microphone and speaker (not shown) for voice communication. Processor 30, generally speaking, is communicatively connected to and controls operation of storage device 32, display 34, user interface 36, and telemetry module 38, all of which are powered by rechargeable battery 40. Processor 30 may also be configured to execute one or more of the functions associated with data refresh engine 22. Processor 30 may include any one or more of a microprocessor, a controller, a digital signal processor (DSP), an application specific integrated circuit (ASIC), a field-programmable gate array (FPGA), or equivalent discrete or integrated logic circuitry. The functions attributed to processor 30 in this disclosure may be embodied as software, firmware, hardware and combinations thereof. Although example mobile 12 of FIG. 3 is illustrated as including one processor 30, other example mobile devices according to this disclosure may include multiple processors that are configured to execute one or more functions attributed to processor 30 of mobile device 12 individually or in different cooperative combinations.

Storage device 32 stores instructions for applications 42 that may be executed by processor 30 and data used in such applications or collected and stored for use outside of mobile device 12, e.g. battery life data. For example, storage device 32 may store instructions executable by processor 30 for applications 42, including an e-mail, calendar, and third party application. Storage device 32 may be a computer-readable, machine-readable, or processor-readable storage medium that comprises instructions that cause one or more processors, e.g., processor 30, to perform various functions. Storage device 32 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media. Generally speaking, storage device 32 may include instructions that cause processor 30 to perform various functions attributed to the processor in the disclosed examples.

Generally speaking, storage device 32 includes memory that stores software that may be executed by processor 30 to perform various functions for a user of mobile device 12, including, e.g., making and receiving cellular telephone calls or other communications like text or e-mail messages, using various software applications. The software included in mobile device 12 may include telemetry and other hardware drivers for the mobile device, operating system software, as well as applications 42. The operating system software of mobile device 12 may be configured to operate on different operating systems, including, e.g., proprietary systems like Microsoft's Windows, Apple's MAC OS, or open source systems like UNIX, Linux, or Google's Chrome or Android.

In another example, mobile device 12 may include proprietary operating system software not based on an open source platform like UNIX. Mobile device 12 also includes various applications 42 stored on storage device 32 and executed by processor 30, including, e.g., e-mail, calendar, contact management, and web browser applications, as well as various types of third-party vendor applications bundled with the device.

Operation of mobile device 12 may require, for various reasons, receiving data from one or more sources including, e.g. application data stored on mail data 24, calendar data 26, and application data 28 from mail server 16, calendar server 18, and application server 20, respectively, as well as transmitting data from the mobile device, e.g. data stored on storage device 32 to one or more external sources, which may also include the data repositories and servers of system 10. For example, mail server 16 may be configured to contact mobile device 12 via network 14 to push refreshed application data to an e-mail application stored on storage device 32 and executed by processor 30.

Data communications to and from mobile device 12 may be handled by telemetry module 38. Telemetry module 38 is configured to transmit data/requests to and receive data/responses from one or more external sources via network 14. Telemetry module 38 may support various wireless communication techniques and protocols, and includes appropriate hardware and software to provide such communications. For example, telemetry module 38 may include an antenna, modulators, demodulators, amplifiers, and other circuitry to effectuate communication between mobile device 12 and mail, calendar, and application servers 16, 18, and 20, respectively, via network 14.

Mobile device 12 includes display 34, which may be, e.g., a liquid crystal display (LCD), light emitting diode (LED) display, e-ink, or other display. Display 34 presents the content of mobile device 12 to a user. For example, display 34 may present the applications executed on device 12 such as an e-mail or calendar application, as well as information about the mobile device, including, e.g., battery life and/or network signal strength. In some examples, display 34 may provide some or all of the functionality of user interface 36. For example, display 34 may be a touch screen that allows the user to interact with mobile device 12. In generally, however, user interface 36 allows a user of mobile device 12 to interact with the device via one or more input mechanisms, including, e.g., an embedded keypad, a keyboard, a mouse, a roller ball, buttons, scroll wheel, touch pad, touch screen, or other devices or mechanisms that allow the user to interact with the device.

In some examples, user interface 36 may include a microphone to allow a user to provide voice commands. Users may interact with user interface 36 and/or display 34 to execute one or more of applications 42 stored on storage device 32. Some of applications 42 may be executed automatically by mobile device 12, such as when the device is turned on or booted up. Additionally, in some examples, users may interact with user interface 36 to configure application data refresh settings controlled by data refresh engine 22.

Battery 40 provides power for all if the various components of mobile device 12, and may be rechargeable. Examples of battery 40 include a lithium polymer battery, a lithium ion battery, nickel cadmium battery, and a nickel metal hydride battery. The life of battery 40 of mobile device 12 depends on many factors. Generally speaking, e.g., the life of battery 40 is affected by loads on the battery caused by using either software or hardware components of mobile device. As different components of mobile device 12, both different hardware and different software components, draw different amounts of power, the load on battery 40 may vary according to component usage patterns. For example, a backlight for display 34 may draw more power than an accelerometer such that the life of battery 40 of mobile device 12 may decrease significantly with increased backlight usage, while being less impacted by increased usage of the accelerometer. In another example, the network access state of mobile device 12, e.g. 3G access, may require more power than another network access state, e.g. Wi-Fi access.

Mobile device 12 also includes data refresh engine 22, the functions of which, in some examples, may be executed by processor 30. As described above with reference to FIG. 1, data refresh engine 22 may be configured to dynamically set application data refresh frequencies for one or more of applications 42 of mobile device 12, e.g. e-mail, calendar, and third party applications, as a function of, e.g., battery state, network access state, and application usage across multiple applications. An example configuration of data refresh engine 22 is illustrated in FIG. 3, including interface module 50, data communication module 52, configuration module 54, and dynamic data refresh module 56.

Interface module 50 of data refresh engine 22 may enable integration of the engine with applications executed on mobile device 12, e.g. applications 42, including, e.g. e-mail, calendar, and third party applications. One or more of the applications included in applications 42 of mobile device 12 may include controls for setting data refresh frequencies. For example, an e-mail application included in applications 42 may be equipped with a default refresh frequency of hourly, but may also enable users to alter the default to increase or decrease the frequency, e.g. every 15 minutes or daily.

Interface module 50 may be configured to communicate data refresh frequencies set dynamically by data refresh engine 22, e.g. dynamic data refresh module 56 of the refresh engine to one or more of applications 42. In this manner, data refresh engine 22 via interface module 50 may propagate dynamically set data refresh frequencies to applications 42 of mobile device 12, e.g. automatically without the need for user intervention. In one example, interface module 50 may be configured to integrate with applications 42 through, e.g., one or more Application Programming Interfaces (APIs) and/or Software Development Kits (SDKs), which may include packaged software components, e.g. algorithms, for interfacing with one or more functions of settings of the applications executed by mobile device 12.

Data communication module 52 of data refresh engine 22 may be configured to mediate or control communication between applications 42 of mobile device 12 and each applications respective remote data repository from which refreshed data is periodically received. For example, data communication module 52 may control or mediate communication between an e-mail application of mobile device 12 and mail server 16 and mail data 24 to periodically receive refreshed e-mail data from mail data 24 via server 16. In one example, data communication module 52 may include wireless communication components configured for refreshing application data for applications 42 of mobile device 12. In another example, however, data communication module 52 of data refresh engine 22 may function in conjunction with telemetry module 38 of mobile device to control or mediate data communications between applications 42 and remote data repositories, e.g. mail data 24, calendar data 26, and application data 28.

Configuration module 54 of data refresh engine 22 may be configured to enable user configuration of various settings by which the refresh engine dynamically sets refresh frequencies for one or more of applications 42 of mobile device 12. For example, configuration module 54 may be configured to allow users to select which of applications 42 with which data refresh engine 22 will interface with and for which the engine will set refresh frequencies. In another example, configuration module 54 may enable the user to set specific values by which data refresh engine 22 will dynamically set refresh frequencies for applications 42 of mobile device 12. For example, configuration module 54 may provide an interface or work in conjunction with user interface 36 of mobile device 12 to enable the user to set a refresh frequency value for one or more of applications 42 for each of a number of different battery states and/or network access states.

In one example, configuration module 54 enables a user to set one of a number of refresh frequencies, e.g. every 15 minutes, every 30 minutes, hourly, daily, or weekly, for each of a number of battery states, including, e.g. power states like charging or in—use, and charge state like different threshold battery life levels of battery 40 of mobile device 12. In another example, configuration module 54 enables a user to set one of a number of refresh frequencies, e.g. every 15 minutes, every 30 minutes, hourly, daily, or weekly, for each of a number of network access states, including, e.g. 3G or Wi-Fi access.

In another example of data refresh engine 22, configuration settings by which the refresh engine dynamically sets data refresh frequencies for applications 42 of mobile device 12 may not be accessible to end-users of the mobile device. In such an example, data refresh engine 22 may be packaged with one or more predetermined configurations by which the engine sets refresh frequencies.

Referring again to the example data refresh engine 22 of FIG. 3, dynamic data refresh module 56 may be configured with one or more algorithms or other sets of computer readable instructions for dynamically setting refresh frequencies for applications 42 of mobile device 12. For example, dynamic data refresh module 56 may include one or more software programs configured to monitor battery and network access states, as well as monitor and record the frequency with which different ones of applications 42 are executed by mobile device 12. Dynamic data refresh module 56 may them employ the values for battery and network access states, and application usage patterns returned from, e.g. battery 40, telemetry module 38, and applications 42 (alone or in conjunction with processor 30 and storage device 32) of mobile device 12 to determine data refresh frequencies for one or more of the applications executed by the mobile device that may act to increase battery life, reduce network congestion, and improve end-user experience with the mobile device.

In one example, the modules of data refresh engine may be stored on storage device 32 and the functions associated with the modules may be executed by processor 30. In another example, however, data refresh engine 22 may include storage and processing capabilities such that interface, data communication, configuration, and dynamic data refresh modules 50-56, respectively, are stored and executed by data refresh engine 22. Interface, data communication, configuration, and dynamic data refresh modules, 50, 52, 54, and 56, respectively, of example data refresh engine 22 are configured to execute respective functions associated with the data refresh engine of mobile device 12 for dynamically setting application data refresh frequencies as a function of, e.g., battery state, network access state, and application usage across multiple applications. However, in another example, data refresh engine 22 may include fewer or more modules for executing the functions described with reference to the examples of this disclosure. Additionally, one or more of interface, data communication, configuration, or dynamic data refresh modules, 50, 52, 54, and 56, or any other module of data refresh engine 22 may be implemented in hardware, software, or combinations thereof incorporated into mobile device 12.

Regardless of the particular configuration of data refresh engine 22 of mobile device 12, e.g. example of FIG. 3 or another example including more or fewer modules, the refresh engine may be configured to dynamically set application data refresh frequencies for one or more of applications 42 executed on the mobile device, e.g. e-mail, calendar, and third party applications, as a function of, e.g., battery state, network access state, and application usage across multiple applications.

In one example, application data refresh frequencies for applications executed by mobile device 12 may be set by data refresh engine 22 as a function of the state of battery 40 of the mobile device. The state of battery 40 may include a number of different characteristics of the battery including, e.g., the power state of the battery or the level of charge remaining in the battery, i.e. the remaining battery life. The power state of battery 40 may include, e.g., charging, when mobile device 12 is plugged into an external power source from which the battery of the device is being charged. The power state of battery 40 may also include in-use, when the battery is not charging and mobile device 12 is operating by drawing power from the battery. The charge level of battery 40 or the battery life of the battery may expressed in a number of different ways, including, e.g., a percentage of fully charged, i.e. 50% charged, or a time before the battery becomes discharged, e.g., 5 hours battery life remaining.

The manner in which data refresh engine 22 employs the state of battery 40 of mobile device 12 as a basis for dynamically setting data refresh frequencies for applications 42 may vary in different examples. In one example, data refresh engine 22 may dynamically set data refresh frequencies for applications 42 executed by mobile device 12 as a function of the battery life of battery 40. For example, in the event battery 40 of mobile device 12 drops below a first threshold battery life, data refresh engine 22 may decrease the refresh frequency for one or more of applications 42 such that the applications receive refreshed data over network 14 less often. In other words, in the event the battery life of battery 40 of mobile device 12 is depleted to a certain level, data refresh engine 22 may automatically decrease the frequency with which some or all of applications 42 receive refreshed data over network 14 to conserve power of the mobile device.

In another example, data refresh engine 22 may automatically disable data refresh for all non-essential (or another classification) applications executed by mobile device 12 in the event battery 40 drops below a second threshold battery life, which may be less than the first threshold. For example, data refresh engine 22 may automatically disable data refresh for every application that does not relate to critical operational functions of mobile device 12, e.g. making and receiving phone calls, in the event battery 40 drops below the second threshold battery life.

In another example, however, data refresh engine 22 may dynamically set data refresh frequencies for applications 42 executed by mobile device 12 as a function of the power state of battery 40. For example, in the event battery 40 of mobile device 12 is plugged into an external power source and is charging, data refresh engine 22 may increase the refresh frequency for one or more of applications 42 such that the applications receive refreshed data over network 14 more often. In other words, in the event battery 40 of mobile device 12 is charging, data refresh engine 22 may automatically increase the frequency with which some or all of applications 42 receive refreshed data over network 14, because conserving power may be less of a concern when the battery is plugged in and charging.

In some examples, data refresh engine 22 may dynamically set data refresh frequencies for applications 42 executed by mobile device 12 as a function of a number of different states of battery 40. For example, in the event battery 40 of mobile device 12 is in-use and drops below a first threshold battery life, data refresh engine 22 may decrease the refresh frequency for one or more of applications 42, such that the applications receive refreshed data over network 14 less often. In other words, in the event the battery life of battery 40 of mobile device 12 is depleted to a certain level and the battery is in-use, i.e. not plugged in and charging, data refresh engine 22 may automatically decrease the frequency with which some or all of applications 42 receive refreshed data over network 14 to conserve power of the mobile device.

In addition to battery state, application data refresh frequencies may be dynamically set by data refresh engine 22 based on the network access state of mobile device 12. The network access state of mobile device 12 may include accessing a number of different types of networks for communications and data transmissions between the device and remote systems, e.g. mail server 16, calendar server 18, application server 20. For example, mobile device 12, and, in particular telemetry module 38 may access a local wireless network employing communications according to one of the 802.11 or Bluetooth specification sets, or another standard or proprietary wireless communication protocol. Telemetry module 38 of mobile device 12 may also access a cellular network, including, e.g. a GSM (Global System for Mobile Communications), CDMA (Code Division Multiple Access), EDGE (Enhanced Data for Global Evolution) network.

In one example, telemetry module 38 of mobile device 12 may be configured to access Wi-Fi local wireless networks and 3G cellular networks. In such an example, data refresh engine 22 may be configured to dynamically set refresh frequencies for one or more of applications 42 executed by mobile device 12 based on whether telemetry module 38 is currently communicating over a Wi-Fi local wireless network or a 3G cellular network. For example, data refresh engine 22 may decrease the refresh frequency for one or more of applications 42 such that the applications receive refreshed data over network 14 less often in the event telemetry module 38 of mobile device 12 is currently communicating over a 3G network. In other words, in the event the network access state of telemetry module 38 of mobile device 12 is 3G cellular network access, data refresh engine 22 may automatically decrease the frequency with which some or all of applications 42 receive refreshed data over network 14 to conserve power of the mobile device and decrease congestion over network 14.

In another example, data refresh engine 22 may increase the refresh frequency for one or more of applications 42 such that the applications receive refreshed data over network 14 more often in the event telemetry module 38 of mobile device 12 is currently communicating over a Wi-Fi local wireless network. In other words, in the event the network access state of telemetry module 38 of mobile device 12 is Wi-Fi network access, data refresh engine 22 may automatically increase the frequency with which some or all of applications 42 receive refreshed data over network 14 because Wi-Fi access may require less power from battery 40 than cellular network access and congestion over network 14 may be less of a concern over the local wireless network infrastructure than over a cellular network.

As an additional parameter by which applications refresh data, mobile device 12, and, in particular, data refresh engine 22, may be configured to dynamically set the frequency with which applications executed by the mobile device receive refreshed data based on the frequency with which the applications are used. In other words, data refresh engine 22 may be configured to prioritize more frequently used applications executed by mobile device 12 over less frequently used applications. For example, data refresh engine 22 of mobile device 12 may set the data refresh frequency for one or more of applications 42 in direct proportion to the usage frequency of the applications. In other words, in one example, data refresh engine 22 may be configured to dynamically set the data refresh frequency for one or more applications 22, such that the refresh frequency of each respective application increases as the usage frequency of the application increases.

In addition to battery and network access state, and application usage patterns, there are additional parameters upon which data refresh engine 22 may base refresh frequency settings for one or more of applications 42 of mobile device 12. In some examples, data refresh engine 22 may apply a default increased priority rating to certain applications executed by mobile device 12 due to the nature of the data upon which the applications operate. For example, applications that require fresh data for accurate and proper operation may be set to an increased priority level regardless of the frequency with which they are used.

In one example, an internet application, e.g. Google Voice may approximate a real-time application such that it is desirable for the application to have access to updated data as frequently as possible, because, e.g. Google Voice may be configured to synchronize an "inbox" of voice messages for users in real time. In such examples, an application may be configured by default with a very high data refresh frequency, e.g. every 5 minutes. Data refresh engine 22 may be configured to maintain at least the default refresh frequency, but may also, in some examples, increase the refresh frequency, depending on various parameters related to mobile device 12, e.g. battery or network access state. For example, data refresh engine 22 may increase the refresh frequency for a real-time application like Google Voice to every 15 to 30 seconds. Additionally, in one example, data refresh engine 22 may employ a time degrade function such that the increased refresh frequency set by the refresh engine may degrade back to the 5 minute interval default setting of the application after a period of inactivity, e.g. to facilitate real time communications while not unnecessarily draining the battery life if battery 40 of mobile device 12.

In another example, mobile device 12, and, in particular, data refresh engine 22 may be configured to group the application data refresh times for some or all of applications 42 together, i.e. at the same time. In some examples, data refresh engine 22 may base refresh frequencies for one or more of applications 42 based not only on the network access state of telemetry module 38 of mobile device 12, but also on the strength of the network signal. For example, data refresh engine 22 may decrease the refresh frequency for one or more of applications when the network access state of telemetry module 38 is accessing a cellular network, e.g. a 3G network, and the signal strength of the network is less than a threshold.

In some examples, data refresh engine 22 may be configured with one or more algorithms that combine some or all of the foregoing parameters to dynamically set refresh frequencies for applications 42 executed by mobile device 12. For example, data refresh engine 22 may be configured to dynamically set refresh frequencies for one or more of applications 42 based on the state of battery 40 and the network access state of telemetry module 38. In another example, data refresh engine 22 may be configured to dynamically set refresh frequencies for one or more of applications 42 based on the state of battery 40, the network access state of telemetry module 38, and the frequency with which the applications are executed by mobile device 12.

One example is illustrated below in Table 1. In the example of Table 1, battery state, both power state and battery life of battery 40, network access state and network signal strength, and application usage patterns are combined by data refresh engine 22 to dynamically set data refresh frequencies for applications 42 executed by mobile device 12. In one example, the data shown in Table 1 may be stored on storage device 32 of mobile device 12. For example, Table 1 may be a look-up table, database, or other organized aggregation of data stored on storage device 32 and accessed by data refresh engine 22 to set data refresh frequencies for applications 42.

TABLE 1

| BATTERY STATE | NETWORK | DATA REFRESH ENGINE ACTION |
|---|---|---|
| Power state = charging<br>Battery life = 100% | Wi-Fi | All applications are aggressively synced every 15 minutes |
| Power state = charging<br>Battery life = 100% | 3G* | Most commonly used applications are aggressively synced every 15 minutes<br>Less common apps (or daily apps) are synced on an hourly basis |
| Power state = charging<br>Battery life <50% | Wi-Fi,<br>3G* | Only most commonly used applications are synced |
| Power state = In-use<br>Battery life = 76-100% | Wi-Fi | Most commonly used applications are synced on an hourly basis |
| Power state = In-use<br>Battery life = 76-100% | 3G* | Most commonly used applications synced every 2-4 hrs, or as needed, based on usage frequency (1 hr poll) |
| Power state = In-use<br>Battery life = 50-75% | Wi-Fi | Most commonly used applications synced every 2-4 hrs, or as needed, based on usage frequency (2 hr poll) |
| Power state = In-use<br>Battery life = 50-75% | 3G* | Most commonly used applications synced every 8 hrs, or as needed based on usage frequency (2 hr poll) |
| Power state = In-use<br>Battery life = 25-50% | Wi-Fi | As needed based on usage frequency (4 hr polling) |
| Power state = In-use<br>Battery life = 25- 0% | 3G* | As needed based on usage frequency (8 hr polling) |
| Power state = In-use<br>Battery life <25% | All | All syncing is disabled except for critical push services, e.g. phone voice mail |
| Power state = In-use<br>Battery life = all levels | 3G signal strength <25% | No syncing other than push services (such as Gmail, Google Voice) |

In Table 1, the network access state examples including an asterisk (*) assume a threshold network signal strength. For example, all of the example network access states in Table 1 with an asterisk (*) may assume that the signal strength of the network is greater than 50%. In another example, all of the example network access states in Table 1 with an asterisk (*) may assume that the signal strength of the network is greater than 75%. In another example, all of the example network access states in Table 1 with an asterisk (*) may assume that the signal strength of the network is greater than 25%.

In the example of Table 1, data refresh engine 22 determines the state of battery 40 and telemetry module 38 of mobile device 12 and dynamically sets the refresh frequencies for applications 42 based on battery and network access state, as well as, in some cases, application usage frequency, and network signal strength. For example, data refresh engine 22 determines that the power state of battery 40 is charging, the battery life of the battery is 100%, and that telemetry module 38 is currently accessing a Wi-Fi network. In this case, data refresh engine refers to Table 1 and determines that based on these battery and network states of mobile device 12, the data for all of applications 42 should be aggressively refreshed every 15 minutes.

In another example, data refresh engine 22 determines that the power state of battery 40 is charging, the battery life of the battery is 100%, and that telemetry module 38 is currently accessing a 3G cellular network. In this case, data refresh engine refers to Table 1, e.g. stored on storage device 32 and determines that based on these battery and network states of mobile device 12, the data for the most commonly used of applications 42 should be aggressively refreshed every 15 minutes while data for less commonly used applications is refreshed only hourly. In this example, data refresh engine 22 may also hold refreshing larger offline data like video and books until the refresh engine determines that telemetry module 38 is accessing or within range of a Wi-Fi network.

In another example, data refresh engine 22 determines that the power state of battery 40 is charging, the battery life of the battery is less than 50%. In this case, regardless of whether telemetry module 38 is currently accessing a 3G cellular or Wi-Fi local wireless network, data refresh engine refers to Table 1, e.g. stored on storage device 32 and determines that based on the battery state of mobile device 12, only the data for the most commonly used of applications 42 should be refreshed, while less commonly used applications do not receive any refreshed data. In this example, data refresh engine 22 may infer from the power state and battery life of battery 40 of mobile device 12 that a user may have plugged in the mobile device to charge because of low battery life, but may only be charging for a short time, thus, aggressively refreshing data for all of applications 42 may not be warranted in this case.

The rest of the examples in Table 1 correspond to battery 40 of mobile device 12 being in use and not plugged-in charging with varying levels of battery life remaining. In general, in these examples, usage patterns for applications 42 become increasingly important as the battery life of battery 40 decreases. In one example, data refresh engine 22 determines that the power state of battery 40 is in-use, the battery life of the battery is less than between 76% and 100%, and telemetry module 38 is currently accessing a Wi-Fi network. In this case, data refresh engine 22 refers to Table 1 and determines that data for the all of applications 42 should be refreshed relatively frequently, e.g. hourly. In this example, although battery 40 is in use, the battery life remaining is close to full, i.e. 76-100%, and telemetry module 38 of mobile device 12 is communicating over a local wireless network, which may require less power per unit of data than if the device were communicating over a cellular network. Thus, data refresh engine 22 determines that all of applications 42 may receive refreshed data and that the refresh frequency may be relatively frequent, in the example of Table 1, once every hour.

In contrast to the foregoing example, in another example illustrated in Table 1, data refresh engine 22 determines that the power state of battery 40 is in-use, the battery life of the battery is less than between 76% and 100%, and telemetry module 38 is currently accessing a 3G cellular network. In this example, data refresh engine 22 refers to Table 1 and determines that data for only the most commonly used of applications 42 should be refreshed. In particular, data refresh engine 22 sets the refresh frequency for the most commonly used of applications 42 to, e.g., somewhere in a range from 2 to 4 hours, or as needed, based on the frequency with which each respective application is used. In this example, data refresh engine decreases the refresh frequency for some of applications 42 over the previous example because the refresh engine determines that telemetry module 38 of mobile device 12 is communicating over a cellular network instead of a local wireless network.

Additionally, data refresh engine 22 adds an additional qualification and only allows data to be refreshed for the most commonly used of applications 42. With respect to application usage, data refresh engine 22 sets the refresh frequency for each of the most commonly used of applications to one of a constant time interval, i.e. 2-4 hours in this particular example, or to correspond to the usage frequency of the application, whichever is longer. In other words, if data refresh engine 22 determines that one of the most commonly used of applications 42 is only used once per day by a user of mobile device 12, then the refresh engine will set the refresh frequency for that application to daily, instead of once every 2-4 hours because this is all that the particular user requires to have fresh data when accessing the application.

Several of the remaining examples illustrated in Table 1 follow a similar pattern as illustrated in the last two examples. That is, data refresh engine 22 determines that the power state of battery 40 is in-use, the battery life of the battery, and telemetry module 38 is accessing a cellular or local wireless network, and then sets the refresh frequency for some of applications 42 to fixed time interval or as needed, based on the frequency with which each respective application is used. In these examples, data refresh engine 22 may employ an addition parameter, polling, to dynamically set refresh frequencies for one or more of applications 42.

Some of applications 42 may be configured to, in addition to refresh data periodically based on a set refresh frequency, periodically poll a remote server, e.g. mail server 16 shown in FIG. 1, to query whether or not there is any new data for the application, e.g. stored on mail data 24. Polling may be an additional parameter by which some or all of applications 42 are configured to refresh data associated with the operation of the application. As such, data refresh engine 22 may also determine whether and what the polling period is for one or more of applications 42 to dynamically set the refresh frequency for that application.

For example, assuming data refresh engine 22 determines that, based on battery and network access state, one or more of applications 42 of mobile device 12 should receive refreshed data on an as needed basis based on usage frequency, the refresh engine may compare the polling period and usage frequency for each of the applications to determine the appropriate refresh frequency. In one example, data refresh engine 22 determines that the usage frequency of one of applications 42 is more often than the polling period for the application. In this example, data refresh engine 22 may set the refresh frequency for the one of applications 42 to the polling period, because this may correspond to the frequency that new data is available for that application. In another example, data refresh engine 22 determines that the usage frequency of one of applications 42 is less often than the polling period for the application. In this example, data refresh engine 22 may set the refresh frequency for the one of applications 42 to the usage frequency, because the user does not require new data more often than the frequency with which they use the application.

The last two examples in Table 1 illustrate situations in which data refresh engine determines that battery 40 has a very low battery life remaining or that the signal strength of the cellular network over which telemetry module 38 of mobile device 12 is communicating is very low, respectively. In one example, data refresh engine 22 determines that the power state of battery 40 is in-use and the battery life of the battery is less than 25%. In this case, regardless of the network access state of telemetry module 38 of mobile device 12, data refresh engine 22 refers to Table 1 and determines that the data refresh for all of applications 42 should be disabled except for critical data push services, like voice mail for cellular telephone services delivered through the mobile device, which may be automatically pushed to the mobile device by a service provider. With regard to other non-critical applications 42 executed by mobile device 12 and that receive data automatically pushed from an external server(s), in one example, data refresh engine 22 may communicate with each application server and request that the server temporarily stop pushing data to the mobile device. In this example, preserving the battery life of battery 40 of mobile device 12 may become important and, as such, data refresh engine 22 may disable data refresh for most or all of applications 42. In one example, data refresh engine 22 may be configured to instruct the remote server(s) to resume data push services to mobile device 12, e.g. after the battery life of battery 40 exceeds a threshold and/or the battery is plugged into an external power source and is charging.

In the last example illustrated in Table 1, data refresh engine 22 determines that the power state of battery 40 is in-use and telemetry module 38 of mobile device 12 is communicating over a cellular network with a low signal strength, e.g. less than 25%. In this case, regardless of the battery life remaining on battery 40 of mobile device 12, data refresh engine refers to Table 1 and determines that the data refresh for all of applications 42 should be disabled except where the applications include data that is automatically pushed to mobile device 12 from a remote server or other device, e.g. data from mail data 24 pushed by mail server 16 or voice mail pushed to the mobile device from a remote service provider device or system. In this example, due to the poor quality of the network connection over which telemetry module 38 is communicating, data refresh engine 22 may disable data refresh for most or all of applications 42 because communication may be slow and prone to error, and may draw an inordinate amount of power from battery 40 negotiating the connection over the poor quality network connection.

Table 1 is one of many possible examples by which data refresh engine 22 may be configured to dynamically set data refresh frequencies for applications 42 of mobile device 12. In other examples, data refresh engine 22 may refer to a table similar to Table 1 including different actions based on the same parameters, e.g. battery and network access state and application usage. In another example, however, data refresh engine 22 may refer to data formatted differently than Table 1, e.g. a relational database including more than one linked tables including various parameters upon which the refresh engine may base refresh frequency settings. Additionally, data refresh engine 22 may increase or decrease the resolution of the parameters upon which it basis its actions to more or fewer possible values than illustrated in Table 1. For example, data refresh engine 22 may determine battery life of battery 40 in increments of 10% rather than 25%, as illustrated in the example of Table 1. In another example, however, data refresh engine 22 may determine battery life of battery 40 in increments of 50% rather than 25%, as illustrated in the example of Table 1.

In some of the foregoing examples, data refresh engine 22 is described as configured to "increase" or "decrease" the refresh frequency of one or more of applications 42 in the event a particular parameter, e.g. battery or network access state, has a particular value, e.g. charging or 3G access. In some examples, the change in refresh frequency executed by data refresh engine 22, i.e. increasing or decreasing the frequency may be relative to some default frequency set for the respective one of applications 42. In other words, in one example, data refresh engine 22 may be configured to decrease the data refresh frequency for one of applications 42 relative to the default frequency set in the application when battery 40 of mobile device 12 has less than 25% battery life remaining.

In another example, increasing or decreasing refresh frequencies may be executed by refresh engine 22 by stepping through specific preset frequencies relative to the current refresh frequency setting. For example, data refresh engine 22 may be configured to increment refresh frequencies for applications 42 in 15 minute increments based on different parameters described in the foregoing examples, e.g. battery or network access state. In one such example, data refresh engine 22 may increase the current refresh frequency of one of applications 42, e.g. an e-mail application, by 15 minutes in the event that the power state of battery 40 of mobile device 12 is charging.

In another example, the manner in which data refresh engine 22 dynamically changes refresh frequencies for one or more of applications 42 may be specific to the particular current state of mobile device 12 and the particular characteristics of the application for which the data refresh engine is setting the frequency. In other words, data refresh engine 22 may determine one or of the foregoing characteristics, e.g. battery life and power state, network access state, application usage frequency, and network signal strength, and set the refresh frequency for one of applications 42 to a particular frequency, e.g. hourly, associated with those current characteristics of mobile device 12.

For example, data refresh engine 22 may set the data refresh frequency for an e-mail application executed by mobile device 12 by first determining that battery 40 has less than 50% battery life, is currently in-use and not plugged-in charging, telemetry module 38 is currently accessing a 3G network, the usage frequency of the e-mail application is hourly, and the signal strength of the 3G network is 75%. Data refresh engine 22 may then search, e.g., a look-up table, database, or other organized aggregation of data stored on storage device 32 for the battery and network access state, usage frequency, and signal strength just determined, and return a particular refresh frequency value associated with those particular values. Such examples of data refresh engine 22 dynamically setting refresh frequencies for applications 42 of mobile device 12 may be similar to the techniques described above with reference to the example including Table 1.

Although mobile device 12 of FIG. 2 is shown as including display 34, aspects of this disclosure should not be considered limited to example mobile devices that include a display. In some examples of mobile device 12, display 34 may be optional. For example, in some examples in which mobile device 12 is a music player or a radio, the device may not include a display.

The foregoing examples may include refreshing data for applications that periodically pull data from a remote server or receive data pushed to them by a remote server. One difference between data push and pull examples may be the device on which the data refresh frequency is set for sending to or receiving new data for applications executed by a mobile device. In one example, in which one of applications 42 of mobile device pulls data from a remote server, e.g. mail server 18, data refresh engine 22 may be configured to dynamically set a data refresh frequency that defines a schedule by which the refresh engine polls the mail server for new data. In another example, in which one of applications 42 of mobile device receives data pushed from a remote server, e.g. application server 20, data refresh engine 22 may be configured to dynamically set a data refresh frequency that causes the refresh engine to contact the application server and request that the remote server change the schedule by which new data is automatically pushed to mobile device 12.

Figure 4:
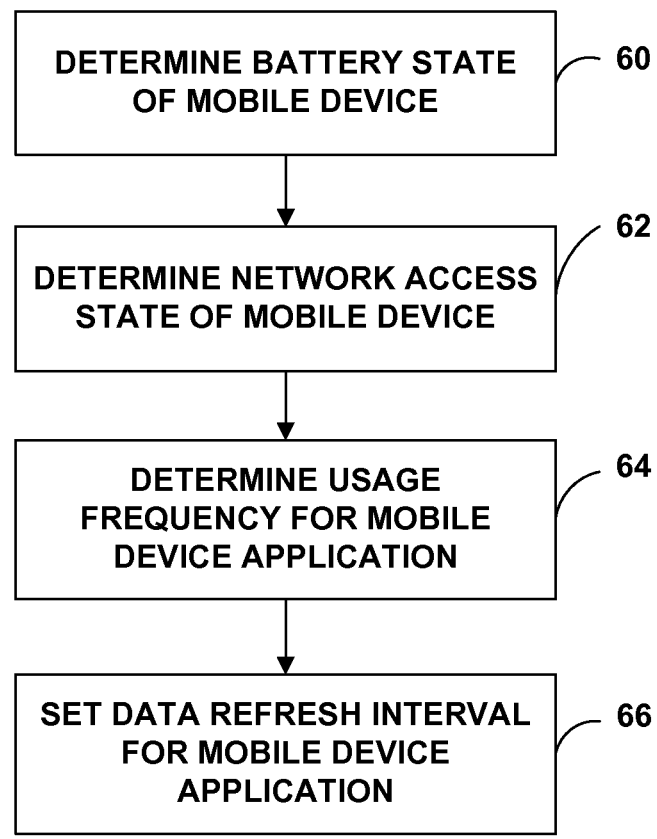
FIG. 4 is a flowchart illustrating an example method of aggregating battery life data from a number of mobile devices.

FIG. 4 is a flowchart illustrating an example method of dynamically setting data refresh frequencies for applications executed on a mobile device. The method of FIG. 4 includes determining a battery state of a mobile device (60), determining a network access state of the mobile device (62), determining usage frequency for one or more applications of the mobile device (64), and setting a data refresh frequency for the applications based one or more of the battery state, network access state, and usage frequency (66). The functions of the method of FIG. 4 for dynamically setting data refresh frequencies for applications executed on a mobile device are described below as carried out by various components of example mobile device 12, and, in particular, data refresh engine 22 of the mobile device for purposes of illustration only. However, in other examples, one or more of the functions of the method of FIG. 4 may be carried out by other devices or systems that differ from mobile device 12 and/or data refresh engine 22 in constitution and arrangement. For example, the method of FIG. 4 may be executed in whole or in part by a processor and storage device of a mobile device with or without the use of a separate data refresh engine, e.g. processor 30 and storage device 32 of mobile device 12 without or in conjunction with data refresh engine 22.

The method of FIG. 4 includes determining a battery state of a mobile device (60). In one example, data refresh engine 22 determines the state of battery 40 of mobile device 12. The state of battery 40 may include a number of different characteristics of the battery including, e.g., the power state of the battery or the level of charge remaining in the battery, i.e. the remaining battery life. The power state of battery 40 may include, e.g., charging, when mobile device 12 is plugged into an external power source from which the battery of the device is being charged. The power state of battery 40 may also include in-use, when the battery is not charging and mobile device 12 is operating by drawing power from the battery. The battery life of battery 40 may expressed in a number of different ways, including, e.g., a percentage of fully charged, i.e. 50% charged, or a time before the battery becomes discharged, e.g., 5 hours battery life remaining.

The method of FIG. 4 also includes determining a network access state of the mobile device (62). In one example, data refresh engine 22 determines the type of network over which telemetry module 38 of mobile device 12 is communicating. The network access state of mobile device 12 may include telemetry module 38 accessing a number of different types of networks for communications and data transmissions between the device and remote systems, e.g. mail server 16, calendar server 18, application server 20. For example, mobile device 12, and, in particular telemetry module 38 may access a local wireless network employing communications according to one of the 802.11 or Bluetooth specification sets, or another standard or proprietary wireless communication protocol. Telemetry module 38 of mobile device 12 may also access a cellular network, including, e.g. a GSM (Global System for Mobile Communications), CDMA (Code Division Multiple Access), EDGE (Enhanced Data for Global Evolution) network. In one example, telemetry module 38 of mobile device 12 is configured to access Wi-Fi local wireless networks and 3G cellular networks.

In addition to determining a network access state of the mobile device (62), the method of FIG. 4 includes determining usage frequency for one or more applications of the mobile device (64). In one example, processor 30 of mobile device 12 monitors the frequency with which each of applications 42 is used and stores usage data on storage device 32. Data refresh engine 22 may then determine, based on the data stored on storage device 32, the frequency with which each of applications 42 is executed on mobile device 12 for purposes of dynamically setting refresh frequencies for the applications.

The method of FIG. 4 also includes setting a data refresh frequency for the applications based one or more of the battery state, network access state, and usage frequency (66). In one example, data refresh engine 22 of mobile device 12 dynamically sets data refresh frequencies for applications 42 based on one or more of the state of battery 40, the type of network over which telemetry module 38 is communicating, and the usage frequency of each of the applications. In some examples, data refresh engine 22 may set refresh frequencies for applications 42 based on additional parameters, e.g. the strength of the signal of the network over which telemetry module 38 is communicating.

As described above, in one example of the method of FIG. 4, data refresh engine may dynamically set data refresh frequencies for applications 42 executed by mobile device 12 as a function of the battery life of battery 40. For example, in the event battery 40 of mobile device 12 drops below a first threshold battery life, data refresh engine 22 may decrease the refresh frequency for one or more of applications 42 such that the applications receive refreshed data over network 14 less often. In another example, data refresh engine 22 may automatically disable data refresh for all non-essential (or another classification) applications executed by mobile device 12 in the event battery 40 drops below a second threshold battery life, which may be less than the first threshold. In another example, data refresh engine 22 may dynamically set data refresh frequencies for applications 42 executed by mobile device 12 as a function of the power state of battery 40.

For example, in the event battery 40 of mobile device 12 is plugged into an external power source and is charging, data refresh engine 22 may increase the refresh frequency for one or more of applications 42 such that the applications receive refreshed data over network 14 more often. In some examples, data refresh engine 22 may dynamically set data refresh frequencies for applications 42 executed by mobile device 12 as a function of a number of different states of battery 40. For example, in the event battery 40 of mobile device 12 is in-use and drops below a first threshold battery life, data refresh engine 22 may decrease the refresh frequency for one or more of applications 42 such that the applications receive refreshed data over network 14 less often.

In addition to battery state, application data refresh frequencies may be dynamically set by data refresh engine 22 based on the network access state of mobile device 12. The network access state of mobile device 12 may include accessing a number of different types of networks for communications and data transmissions between the device and remote systems, e.g. mail server 16, calendar server 18, application server 20, including, e.g. cellular networks and local wireless networks. In one example, telemetry module 38 of mobile device 12 is configured to access Wi-Fi local wireless networks and 3G cellular networks. In such an example, data refresh engine 22 may be configured to dynamically set refresh frequencies for one or more of applications 42 executed by mobile device 12 based on whether telemetry module 38 is currently communicating over a Wi-Fi local wireless network or a 3G cellular network.

For example, data refresh engine 22 may decrease the refresh frequency for one or more of applications 42 such that the applications receive refreshed data over network 14 less often in the event telemetry module 38 of mobile device 12 is currently communicating over a 3G network to conserve power of the mobile device and decrease congestion over network 14. In another example, data refresh engine 22 may increase the refresh frequency for one or more of applications 42 such that the applications receive refreshed data over network 14 more often in the event telemetry module 38 of mobile device 12 is currently communicating over a Wi-Fi local wireless network because Wi-Fi access may require less power from battery 40 than cellular network access and congestion over network 14 may be less of a concern over the local wireless network infrastructure than over a cellular network.

Mobile device 12, and, in particular, data refresh engine 22 may be also configured to dynamically set the frequency with which applications 42 executed by the mobile device receive refreshed data based on the frequency with which the applications are used. In other words, data refresh engine 22 may be configured to prioritize more frequently used applications executed by mobile device 12 over less frequently used applications. For example, data refresh engine 22 of mobile device 12 may set the data refresh frequency for one or more of applications 42 in direct proportion to the usage frequency of the applications. In other words, in one example, data refresh engine 22 may be configured to dynamically set the data refresh frequency for one or more applications 22 such that the refresh frequency of each respective application increases as the usage frequency of the application increases.

In some examples of the method of FIG. 4, data refresh engine 22 may be configured with one or more algorithms that combine some or all of the foregoing parameters to dynamically set refresh frequencies for applications 42 executed by mobile device 12. For example, data refresh engine 22 may be configured to dynamically set refresh frequencies for one or more of applications 42 based on the state of battery 40 and the network access state of telemetry module 38. In another example, data refresh engine 22 may be configured to dynamically set refresh frequencies for one or more of applications 42 based on the state of battery 40, the network access state of telemetry module 38, and the frequency with which the applications are executed by mobile device 12. In another example, data refresh engine 22 may be configured to dynamically set refresh frequencies for one or more of applications 42 based on the state of battery 40, the network access state of telemetry module 38, the frequency with which the applications are executed by mobile device 12, and additional parameters such as network signal strength, as described above with reference to the example employing Table 1.

Although the foregoing examples are described with reference to mobile devices including rechargeable batteries as power sources, the disclosed techniques may be applied to power consumption in general in which such mobile devices employ alternative power sources. As such, instead of collecting, correlating, and aggregating battery life data from a number of mobile devices, the disclosed techniques may be employed more generally to collect, correlate, and aggregate power source data from a number of mobile devices. Examples of alternative power sources that may be employed in mobile devices include fuel cells, super capacitors, non-rechargeable batteries, solar cells, and any other power source configured to power a mobile device.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media. In some examples, an article of manufacture may comprise one or more computer-readable storage media.

In some examples, computer-readable storage media may comprise non-transitory media. The term "non-transitory" may indicate that a storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method comprising:
    determining, by one or more processors of a mobile device, a battery state and a network access state of the mobile device, wherein the battery state comprises one or both of a power state and a charge state of a battery of the mobile device, wherein the network access state comprises a type of network accessed by the mobile device for communications and data transmissions between the mobile device and a computing device external to the mobile device, wherein determining the battery state comprises determining whether the battery of the mobile device is in use, wherein the battery of the mobile device is in use when the battery is not charging and when the mobile device is operating by drawing power from the battery, and wherein determining the network access state comprises determining the type of network accessed by the mobile device and a signal strength of the network accessed by the mobile device; and
    setting, by the one or more processors, a data refresh frequency for at least one application executable by the mobile device based at least on whether the battery of the mobile device is in use and on the type and the signal strength of the network accessed by the mobile device, wherein the data refresh frequency comprises a frequency with which updated data for the at least one application is periodically received from the computing device external to the mobile device,
    wherein the at least one application comprises a graphical user interface configured to receive and respond to user input and present information at the mobile device.

2. The method of claim 1, further comprising determining a usage frequency with which the at least one application is used on the mobile device.

3. The method of claim 2, further comprising setting the data refresh frequency for the at least one application based on the usage frequency of the at least one application.

4. The method of claim 3, wherein setting the data refresh frequency for the at least one application based on the usage frequency of the at least one application comprises setting the data refresh frequency for the at least one application in direct proportion to the usage frequency of the at least one application, such that the refresh frequency increases as the usage frequency increases.

5. The method of claim 1, wherein setting the data refresh frequency for the at least one application executable by the mobile device comprises setting data refresh frequencies for a plurality of applications executable by the mobile device, such that a refresh time for two or more applications of the plurality of applications is the same.

6. The method of claim 5, further comprising:
    determining a respective usage frequency with which each of the plurality of applications is used on the mobile device; and
    setting data refresh frequencies for the two or more applications of the plurality of applications such that the respective refresh time for each application of the two or more applications is the same when the respective usage frequencies for the two or more applications are within a threshold difference of one another.

7. The method of claim 1, wherein setting the data refresh frequency for the at least one application executable by the mobile device comprises increasing the data refresh frequency for the at least one application when the battery state indicates that the battery of the mobile device is charging.

8. The method of claim 1, wherein setting the data refresh frequency for the at least one application executable by the mobile device comprises increasing the data refresh frequency for the at least one application when the battery state indicates that the battery of the mobile device is charging and has a battery life above a threshold.

9. The method of claim 1, wherein setting the data refresh frequency for the at least one application executable by the mobile device comprises increasing the data refresh frequency for the at least one application when the battery state indicates at least one of that the battery of the mobile device is charging or has a battery life above a threshold.

10. The method of claim 1, wherein setting the data refresh frequency for the at least one application executable by the mobile device comprises decreasing the data refresh frequency for the at least one application when the battery state indicates that the battery of the mobile device is in use.

11. The method of claim 1, wherein setting the data refresh frequency for the at least one application executable by the mobile device comprises decreasing the data refresh frequency for the at least one application when the battery state indicates that the battery of the mobile device is in use and has a battery life below a threshold.

12. The method of claim 1, wherein setting the data refresh frequency for the at least one application executable by the mobile device comprises disabling data refresh for the at least one application when the battery state indicates that the battery of the mobile device is in use and has a battery life below a threshold.

13. The method of claim 1, wherein setting the data refresh frequency for the at least one application executable by the mobile device comprises increasing the data refresh frequency for the at least one application when the network access state indicates that the mobile device is accessing a wireless network.

14. The method of claim 1, wherein setting the data refresh frequency for the at least one application executable by the mobile device comprises decreasing the data refresh frequency for the at least one application when the network access state indicates that the mobile device is accessing a cellular network.

15. The method of claim 14, further comprising decreasing the data refresh frequency for the at least one application further when the network access state indicates that the mobile device is accessing a cellular network and the signal strength of the cellular network is less than a threshold.

16. The method of claim 1, wherein setting the data refresh frequency for the at least one application executable by the mobile device comprises disabling data refresh for the at least one application when the network access state indicates that the mobile device is accessing a cellular network access and the signal strength of the cellular network is less than a threshold.

17. The method of claim 1, wherein setting the data refresh frequency for the at least one application comprises setting a frequency with which the mobile device periodically pulls updated data from the computing device external to the mobile device.

18. The method of claim 1, wherein setting the data refresh frequency for the at least one application comprises setting a frequency with which the computing device external to the mobile device is configured to push updated data to the mobile device.

19. A mobile device configured to execute at least one application, comprising:
   a battery;
   a telemetry module; and
   at least one processor configured to determine a battery state of the battery and a network access state of the telemetry module and setting a data refresh frequency for the at least one application based on the battery state and the network access state,
   wherein the battery state comprises one or both of a power state and a charge state of the battery,
   wherein the network access state comprises a type of network accessed by the telemetry module for communications and data transmissions between the mobile device and a computing device external to the mobile device,
   wherein the at least one processor is configured to determine the battery state at least by determining whether the battery of the mobile device is in use, the battery of the mobile device being in use when the battery is not charging and when the mobile device is operating by drawing power from the battery, wherein the at least one processor is configured to determine the network access state at least by determining the type of network accessed by the telemetry module and a signal strength of the network accessed by the telemetry module,
   wherein the at least one processor is configured to set the data refresh frequency for the at least one application based at least on whether the battery is in use and on the type and the signal strength of the network accessed by the telemetry module, the data refresh frequency comprising a frequency with which updated data for the at least one application is periodically received from the computing device external to the mobile device, and
   wherein the at least one application comprises a graphical user interface configured to receive and respond to user input and present information at the mobile device.

20. A tangible computer readable storage medium comprising instructions for causing at least one programmable processor of a mobile device to:
   determine a battery state and a network access state of the mobile device, wherein the battery state comprises one or both of a power state and a charge state of a battery of the mobile device and the network access state comprises a type of network accessed by the mobile device for communications and data transmissions between the mobile device and a computing device external to the mobile device, wherein determining the battery state comprises determining whether the battery of the mobile device is in use, wherein the battery of the mobile device is in use when the battery is not charging and when the mobile device is operating by drawing power from the battery, and wherein determining the network access state comprises determining the type of network accessed by the mobile device and a signal strength of the network accessed by the mobile device; and
   set a data refresh frequency for at least one application executable by the mobile device based at least on whether the battery of the mobile device is in use and on the type and the signal strength of the network accessed by the mobile device, wherein the data refresh frequency comprises a frequency with which updated data for the at least one application is periodically received from the computing device external to the mobile device,
   wherein the at least one application comprises a graphical user interface configured to receive and respond to user input and present information at the mobile device.

21. The method of claim 1, wherein setting the data refresh frequency for the at least one application executable by the mobile device comprises increasing the data refresh frequency for the at least one application when the battery state indicates that the battery of the mobile device has a battery life above a threshold and the network access state indicates that the mobile device is accessing a wireless network.

22. The method of claim 1, wherein setting the data refresh frequency for the at least one application executable by the mobile device comprises decreasing the data refresh frequency for the at least one application when the battery state indicates that the battery of the mobile device has a battery life below a threshold and the network access state indicates that the mobile device is accessing a cellular network.

23. The method of claim 1, wherein the at least one application comprises an e-mail, calendar, contact management, or web browser application.

* * * * *